Jan. 5, 1954     R. G. LE TOURNEAU     2,665,110
LOGGING TRACTOR

Filed June 1, 1950                                            4 Sheets-Sheet 1

FIG. 1

INVENTOR.
R. G. LeTourneau
BY
T. D. Copeland Jr.
AGENT

INVENTOR.
R. G. LeTOURNEAU
BY
F. D. Copeland Jr.
AGENT

Patented Jan. 5, 1954

2,665,110

UNITED STATES PATENT OFFICE 2,665,110

LOGGING TRACTOR

Robert G. Le Tourneau, Longview, Tex., assignor to R. G. Le Tourneau, Inc., Peoria, Ill., a corporation of California Application June 1, 1950, Serial No. 165,491

5 Claims. (Cl. 254—150)

This invention relates to tractors employed in hauling logs out of the woods or along haul roads.

The primary object of this invention is to provide a high speed rubber tired tractor which includes a special structure and mount to permit a logging arch group (including a winch) to be mounted directly to the tractor case and to be powered by the tractor.

Another object is to provide a logging arch group which comprises a longitudinally adjustable roller structure support and a vertically adjustable roller structure to provide for selective positioning of the fairleads and roller to suit varied operating conditions.

A further object is to provide for installation of a heavy duty electric winch closely adjacent the roller structure support to permit the winch cable to be selectively reeled in or out under power even when the tractor is moving.

Yet another object is to provide a tractor for logging work which includes a bulldozer blade group at the front of the tractor, an adjustable logging arch group at the rear of the tractor and an overhead crash bar connected to and bracing both groups and also providing a safety measure for the tractor operator.

Other objects and advantages will appear from an examination of the following specification and the accompanying drawings in which:

Fig. 1 represents a side elevation of my improved logging tractor in which the right side wheels and other parts have been omitted to more clearly show structural details.

Figure 2:
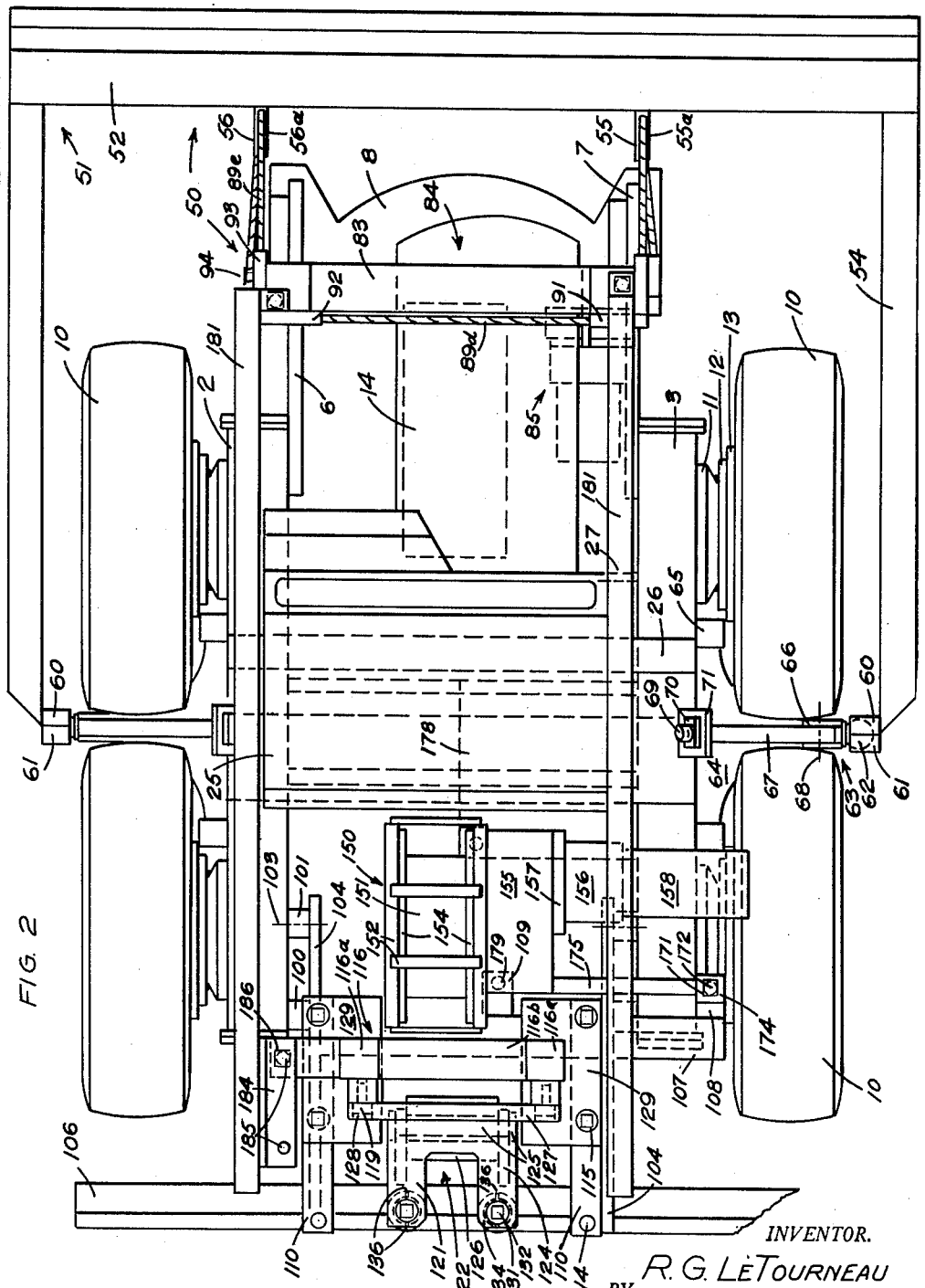
Fig. 2 represents a plan view of my logging tractor with the right rear crash bar bolt plate and bracket omitted to show other details.

Referring now more particularly to the drawings, the invention at hand will be seen to consist generally of a tractor including a main frame 1 made up generally of two longitudinally extending final drive cases 2 and 3 which are spaced apart by transverse walls 4 and 5; also a part of frame 1 are forwardly extending triangular plates 6 and 7 which attach to and support front cross plate 8, and a rear cross beam 9 connects and reinforces the cases 2 and 3 at their rearward ends. The main frame 1 is supported for movement along the ground by large pneumatic tired wheels 10 which are rotatably supported on drive axles (not shown) projecting through hubs 11 including a welded on brake back up plate 12 and a brake 13.

From suitable mounting blocks (not shown) located on the frame, an engine 14 is supported forwardly on the tractor and between cases 2 and 3. The engine 14 is directly connected to a flywheel in housing 15 and an in-line generator 16. A flange 17 attaches generator 16 directly to transverse wall 5, and the generator shaft 18 projects on through the opening 19 formed by walls 4 and 5 into a unitary transmission 20. This transmission is of the constant mesh type as shown in my co-pending application Serial No. 735,484, filed March 18, 1947, now Patent No. 2,553,376, and includes external clutches 21. From transmission 20 an output shaft, shown partially at 22 includes a bevel gear pinion and drives a bevel ring gear, cross shaft, steering clutches and final drive gears within cases 2 and 3 which ultimately supply power to the wheels in a manner shown in detail in my copending application Serial No. 727,804, filed February 11, 1947, now Patent No. 2,630,638, and also in my copending application Serial No. 97,121, filed June 4, 1949.

Figure 4:
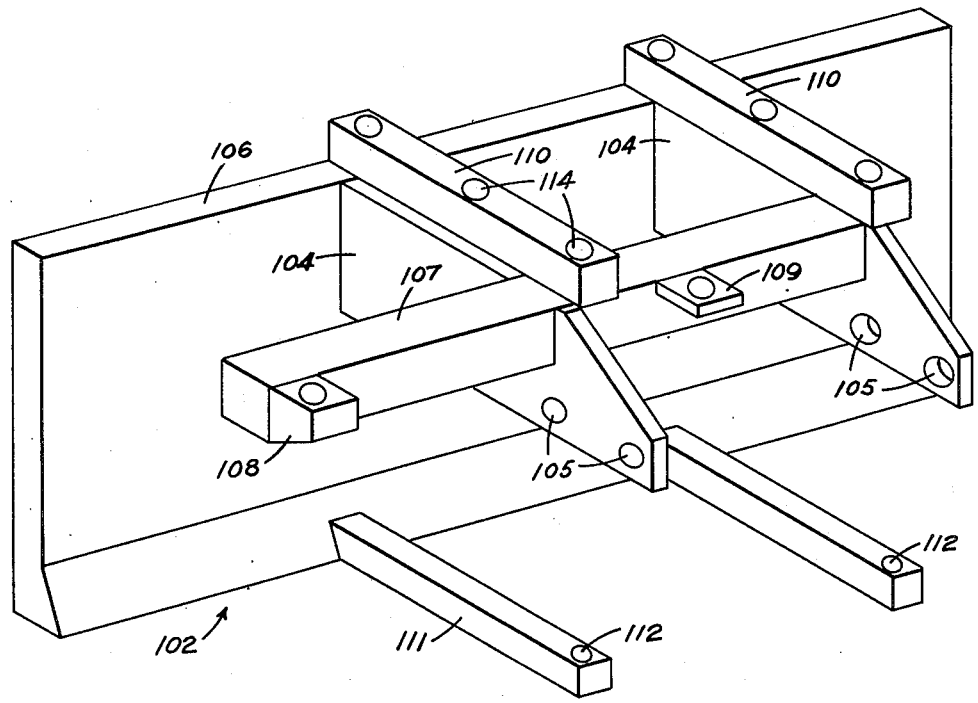
Fig. 4 is a front view showing the details of the roller structure support mount in isometric.
Figure 5:
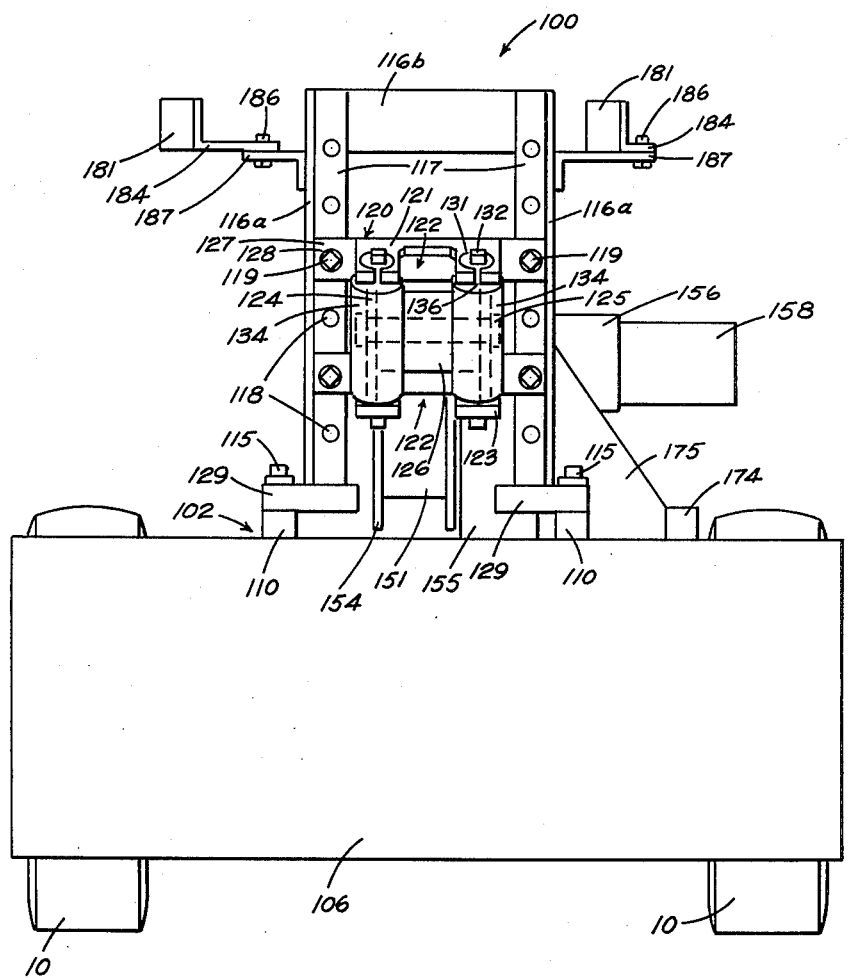
Fig. 5 is a rear end elevation of the logging tractor shown in Figs. 1 and 2.

The substance of the instant invention resides mainly in the logging arch group, indicated generally at 100, supported from the main frame 1 and at the rear portion of the tractor. Final drive cases 2 and 3 each include longitudinally spaced bolt blocks 101 to which a roller structure support mount indicated generally at 102 (and shown in detail in Fig. 4) is removably attached by capscrews as indicated at 103. The mount itself is made up of two spaced apart plates 104, including mounting holes 105, connected at one end to a bumper 106 and connected intermediate their ends to cross beam 107. Two transverse winch mounting blocks 108 and 109 are supported from cross beam 107. Horizontal rails 110 are supported by and overlay cross beam 107 and bumper 106. Parallel braces 111 are directly beneath rails 110 and are welded to bumper 106 at one end and include bolt holes 112 at their other end for attaching to pads 113 supported from rear cross beam 9. Each rail 110 includes a plurality of longitudinal aligned tapped holes 114 to receive tapered head capscrews 115 for securing a vertical roller structure support 116 to rails 110 at selective locations. Support 116 includes spaced uprights 116a and a lateral cross member 116b connected at the top thereof. Uprights 116a are attached to vertical rails 117 which include a plurality of vertically aligned tapped holes 118 for reception of capscrews 119 to secure a roller structure 120 in selective vertical locations. Roller structure 120 is made up of a top plate 121 and bottom plate 123 including cut-away portions 122 and spaced side pieces 124 which reinforce the top and bottom plates and also retain bolt 125 which acts as a shaft for roller 126 which is journalled thereon. Top and bottom plates 121 and 123 as well as side plates 124 are all attached to transverse mounting plates 127 which contain sockets 128 to receive capscrews 119 which threadedly engage aligned holes 118 to secure roller structure 120 on its support 116. Spaced base plates 129 include tapered sockets 130 to accommodate tapered head capscrews 115 in threaded engagement with the selected holes 114. The rearward end of U-shaped top and bottom plates 121 and 123 include tapped holes 131 to receive threaded bearing plugs 132 which have a machined extension 133 which projects into fairlead 134 and supports the fairlead for rotary motion by means of bearings 135. That portion of plates 121 and 123 which immediately surrounds holes 131 is split at diametrically opposite points as indicated by slot 136. This arrangement acts as a locking device to retain plugs 132 in place since the threads of holes 131 bind the threads of plugs 132.

A phantom cut-away view 120a shows the position of roller structure 120 after a forward and upward adjustment of support 116 and roller structure 120.

In examining the winch sub-group indicated generally as 150, it will be seen that a large cable drum 151 is adapted to rotate within cable guard frame 152 which surrounds the drum to prevent cable 153 from overriding the vertical walls 154 of drum 151. This drum is powered from a reduction gear case 155 which is connected to a motor gear box 156 by means of bolt flange 157 and the drum, gear case, and motor gear box are operatively connected to a reversible electric motor 158.

Figure 3:
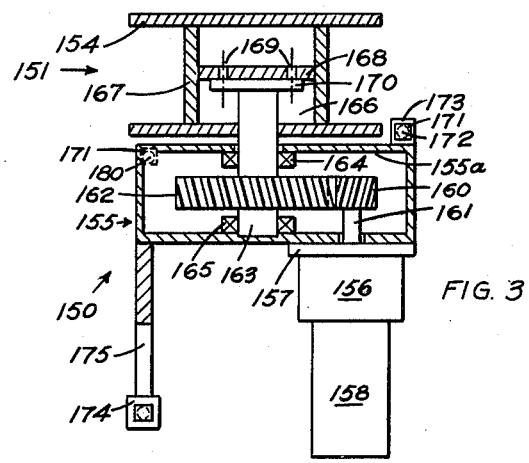
Fig. 3 is a sectional plan view, partly in schematic showing the power drive arrangement of the winch group.

Details of the operative connections of the winch sub-group are shown partly in schematic in Fig. 3. An output pinion 160 is attached to shaft 161 projecting out of motor gear box 156. Helical pinion 160 is in mesh with a large helical reduction gear 162 which is keyed to shaft 163. This shaft is journalled at opposite sides of gear box 155 as at 164 and 165, and it projects thru wall 155a of gear box 155 into the hollow center space 166 of drum 151. This drum is of simple construction, being composed of vertical walls 154 spaced apart by a cylindrical shell 167 which is itself reinforced by a circular plate 168 which includes a bolt circle 169 by which it is attached to drive flange 170 on shaft 163. Flange 170 includes a corresponding bolt circle by which it attaches to and drives plate 168 and consequently drum 151. The winch sub-group 150 is attached and supported by means of three capscrews 171, two of which pass thru drilled holes 172 in bolt block 173 attached to gear case 155 and bolt block 174 spaced therefrom by a welded on triangular support 175. Bolts 171 threadedly engage tapped holes 176 in mounting block 108 on cross beam 107 and mounting block 177 rigid with plate 178 which overlays and is attached to the main case 1 of the tractor. The third capscrew 171 is inserted thru drilled hole 179 of mounting pad 109 from the underside thereof and threadedly engages a tapped hole 180 in bottom corner of gear case 155. This three point support provides a rigid stable mounting for the winch sub-group 150 at a location between the roller structure support 116 and the tractor cab 25.

A fuel tank structure 26 rests on and extends between final drive cases 2 and 3 and provides part of the support for cab 25. Additional support is obtained from a vertical panel 27 which is part of a cockpit structure 28 which the cab 25 completes an enclosure for.

A bulldozer blade group indicated generally at 50 is associated with the front end of the tractor. The blade structure 51 is composed of a transversely extending moldboard 52 with a blade 53 at its lower front end and longitudinally extending push beams 54 attached to the moldboard at their forward ends; sheave housings 55 and 56 including sheaves 55a and 56a journalled therein as at 57 are spaced transversely on the back side of moldboard 52. Push beams 54 include a half-socket 60 welded to their rearmost end. A removable socket block 61 cooperates with half-socket 60 when the latter surrounds ball joint 62 to provide a universal connection between blade structure 54 and push beam mounts 63. The complete mount 63 includes a generally T-shaped mounting arm 64 which is inserted for pivotal movement in blocks 65 welded at the bottom of final drive cases 2 and 3. The outer end of arm 64 includes the mentioned ball joint 62, and adjacent the ball joint is equipped with bracket 66 wherein an adjustment rod 67 is pivoted as at 68. Rod 67 is threaded at its upper end 69 and is maintained in a rigid but adjustable position by adjustment nuts 70, which are threaded thereto on opposite sides of bracket 71. It will be observed from this construction that push beams 54 and consequently bulldozer blade structure 51 are maintained in a rigid but transversely tiltable relation to the main frame 1.

The following mechanism is used to adjustably suspend the moldboard 52 in a vertical plane at the forward end of the tractor. Two upstanding posts 80 include a bottom brace 81 and bolt plate 82 to permit removable attachment to cross plate 8 by means of bolts 82a. A cross beam 83 is welded to each post 80 at an intermediate position to impart rigidity to the H-shaped suspension frame referred to generally as 84. A reversible electric winch 85 is supported from the back side of right post by means of a vertical plate 86 which is welded to upper and lower horizontal strips 87 which are in turn welded to post 80 to provide a rigid support for winch 85. A cable guard 88 surrounds the winch drum (not shown) on which a cable 89 is spooled. Cable 89 includes lead 89a which passes from winch 85 up and over sheave 90a of sheave housing 90 and down as lead 89b around sheave 55a of housing 55 attached to the inner side of moldboard 52 and back up as lead 89c to a second sheave 90b of housing 90. From this point it is directed down as lead 89d and under and around a pair of spaced direction changing sheaves in housing 91 and 92 welded to post 80 and crossbeam 83 and thence up and over sheave 93a of housing 93 and down and about sheave 56a of housing 56 as lead 89e and as lead 89f back up to the outside of housing 93 to cable anchor 94. Winch 85 operating cable 89 will raise moldboard 52 at a reduced speed but with a distributed load and increased power due to the previously described cable rigging.

Frame 84 at the front of the tractor and frame 116 at the rear are jointly braced by a pair of overhead crash bars 181 which are removably attached to the upstanding posts 80 by capscrews 182 which secures crash bar bracket 183 to the top of post 80. At their rear crash bars 181 include bolt plate 184 welded thereto. This plate 184 includes a plurality of longitudinally aligned holes 185 which are spaced to correspond to the spacing of tapped holes 114 of rail 110 and thru which capscrews 186 may engage bracket 187 of mount 116. Crash bars 181 are connected by cross member 188 to increase the rigidity of the now completed frame encompassing all of the tool frames on the tractor and also providing a sturdy protective framing for the operator and the machine to protect both from falling trees, and other hazards likely to be encountered in logging operations.

In operation, roller structure 120 is adjusted vertically for several purposes. It is essential that it be high enough to lift the front end of the logs off the ground and the height for this purpose varies with the diameter of the logs. It has been found that it is easier to drag a load of logs as this height is increased above the bare minimum to get the front end of the logs off the ground. However if this height is too great and the load is of sufficient weight, the forces in play will cause the front wheels to lose their traction and even raise off the ground in some cases. So it will be seen that the optimum position for dragging logs depends on several factors including the diameter of the logs, the weight of the total load, and the traction required, which is in turn dependant of the condition of the ground, i. e., soft, firm, mushy. Another operation which requires the roller in the lowest possible position, is when the tractor is stationary and the winch is used as a "yarder." In this operation the nearest possible straight line pull between the winch and the logs is desirable. The longitudinal adjustment of roller structure support 116 is generally for the same purposes as above mentioned and is additive in its effect. For instance as support 116 is moved further to the rear, the moment arm tending to tip the tractor about its rear wheels increases, but it must necessarily be rearward to lift the front end of the logs off the ground when the tractor is used for "arch logging." However when the tractor is used for "bob-tailing" which consists of merely dragging the logs along the ground it is not necessary to lift the front of the logs up and better traction can be obtained when support 116 is in a forward position. The same is true in the operation known as "pan-skidding" which is basically the same as "bob-tailing" but wherein a metal pan is placed under the front end of the logs to prevent their digging into the ground. Also on down grade pulls, the support 116 is used in its forward position.

It will be recognized from the above specification that one of the main features of this invention is that the operator is provided with a tractor mounted logging arch which is adjustable to suit varied operating conditions.

From the foregoing description it will be readily seen that I have produced such a device as substantially fulfills the objects of the invention as set forth herein.

While this specification sets forth in detail the present and preferred construction of this invention, still in practice such deviations from such detail may be resorted to as do not form a departure from the spirit of the invention, as defined in the appended claims.

Having thus described my invention, what I claim as new and useful and desire to secure by Letters Patent is:

1. A logging tractor comprising a main frame, drive means for supporting said frame, an engine on the tractor for supplying power to said drive means, a mount removably fastened to said frame at the rear of said tractor and carried by said frame, a roller support structure attached to and carried by said mount, a roller support carried by said structure, said roller support including a horizontal roller and fairleads positioned one at each end of the roller, a winch supported from the tractor and located forward of the roller support structure, and a cable from said winch passing over said roller and between said fairleads for attachment to a load beyond the rear end of the tractor, said roller support structure being adjustable longitudinally of said tractor on said mount, and said roller support being adjustable vertically on said support structure.

2. A logging tractor comprising a main frame; drive means supporting said frame; an engine on said tractor for supplying power to said drive means; a pair of spaced longitudinally extending horizontal rails carried by said tractor adjacent the rear end thereof; a sub-frame including an inverted "U" shaped member and longitudinally extending base plates mounted on said rails and adjustable thereon longitudinally of said tractor; a roller support mounted upon said sub-frame and vertically adjustable thereon; said roller support comprising a pair of vertically spaced transversely extending rails, a top plate and a bottom plate extending respectively rearwardly from said transversely extending rails, and side plates attached to said rails and said top and bottom plates; a roller extending horizontally in said roller support; fairleads extending substantially vertically between said top and bottom plates and positioned one at each end of said roller; and a winch mounted on said tractor forwardly of said roller support adapted to wind a cable reeved over said roller and rearwardly between said fairleads.

3. A logging tractor comprising a main frame; drive means supporting said frame; an engine on said tractor for supplying power to said drive means; a pair of spaced longitudinally extending horizontal rails carried by said tractor adjacent the rear end thereof; a sub-frame including an inverted "U" shaped member and longitudinally extending base plates mounted on said rails and adjustable thereon longitudinally of said tractor; a roller support mounted upon said sub-frame and vertically adjustable thereon; said roller support comprising a pair of vertically spaced transversely extending rails, a top plate and a bottom plate extending respectively rearwardly from said transversely extending rails, and side plates attached to said rails and said top and bottom plates; a roller extending horizontally between said side plates in said roller support; fairleads extending substantially vertically between said top and bottom plates and positioned one at each end of said roller; and a winch mounted on said tractor forwardly of said roller support adapted to wind a cable reeved over said roller and rearwardly between said fairleads.

4. A logging tractor comprising a main frame; drive means supporting said frame; an engine on said tractor for supplying power to said drive means; a pair of spaced longitudinally extending horizontal rails carried by said tractor adjacent the rear end thereof; a sub-frame including an inverted "U" shaped member and longitudinally extending base plates mounted on said rails and adjustable thereon longitudinally of said tractor; a roller support mounted upon said sub-frame and vertically adjustable thereon; said roller support comprising a pair of vertically spaced transversely extending rails, a top plate and a bottom plate extending respectively rearwardly and downwardly from said transversely extending rails, and side plates attached to said rails and said top and bottom plates; a roller extending horizontally in said roller support; fairleads between said top and bottom plates extending at an angle to the vertical in planes parallel to the longitudinal axis of said tractor, the upper ends of said fairleads being pitched rearwardly of the lower ends thereof, and positioned one at each end of said roller; and a winch mounted on said tractor forwardly of said roller support adapted to wind a cable reeved over said roller and rearwardly between said fairleads.

5. A logging tractor comprising a main frame; drive means supporting said frame; an engine on said tractor for supplying power to said drive means; a pair of spaced longitudinally extending horizontal rails carried by said tractor adjacent the rear end thereof; a sub-frame including an inverted "U" shaped member and longitudinally extending base plates mounted on said rails and adjustable thereon longitudinally of said tractor; a roller support mounted upon said sub-frame and vertically adjustable thereon; said roller support comprising a pair of vertically spaced transversely extending rails, a top plate and a bottom plate extending respectively rearwardly and downwardly from said transversely extending rails, and side plates attached to said rails and said top and bottom plates; a roller extending horizontally between said side plates in said roller support; fairleads extending between said top and bottom plates at an angle to the vertical in planes parallel to the longitudinal axis of said tractor, the upper ends of said fairleads being pitched rearwardly of the lower ends thereof, and positioned one at each end of said roller; and a winch mounted on said tractor forwardly of said roller support adapted to wind a cable reeved over said roller and rearwardly between said fairleads.

ROBERT G. LE TOURNEAU.

References Cited in the file of this patent

UNITED STATES PATENTS

| Number | Name | Date |
|---|---|---|
| 1,438,394 | Packer | Dec. 12, 1922 |
| 1,874,007 | Heaton | Aug. 30, 1932 |
| 1,916,732 | Le Tourneau | July 14, 1933 |
| 1,987,688 | Lamb | Jan. 15, 1935 |
| 2,081,939 | Le Tourneau | June 1, 1937 |
| 2,156,183 | King | Apr. 25, 1939 |
| 2,182,781 | Andersen et al. | Dec. 12, 1939 |
| 2,230,704 | Sorensen | Feb. 4, 1941 |
| 2,305,630 | McNeil | Dec. 22, 1942 |
| 2,441,132 | Blakey | May 11, 1948 |
| 2,492,914 | Barden | Dec. 27, 1949 |

FOREIGN PATENTS

| Number | Country | Date |
|---|---|---|
| 13,067 | Great Britain | of 1898 |
| 109,676 | Australia | Jan. 24, 1940 |